US012432480B2

(12) United States Patent
Wang et al.

(10) Patent No.: US 12,432,480 B2
(45) Date of Patent: Sep. 30, 2025

(54) WIRELESS EARPHONE ASSEMBLY

(71) Applicant: Acer Incorporated, New Taipei (TW)

(72) Inventors: Dong-Yu Wang, New Taipei (TW); Chun-Hung Wen, New Taipei (TW)

(73) Assignee: Acer Incorporated, New Taipei (TW)

( * ) Notice: Subject to any disclaimer, the term of this patent is extended or adjusted under 35 U.S.C. 154(b) by 193 days.

(21) Appl. No.: 18/462,416

(22) Filed: Sep. 7, 2023

(65) Prior Publication Data

US 2025/0030970 A1 Jan. 23, 2025

(30) Foreign Application Priority Data

Jul. 21, 2023 (TW) ................................ 112127252

(51) Int. Cl.
*H04R 1/10* (2006.01)

(52) U.S. Cl.
CPC ......... *H04R 1/1025* (2013.01); *H04R 1/1016* (2013.01); *H04R 2420/07* (2013.01)

(58) Field of Classification Search
CPC .. H04R 1/1025; H04R 1/1016; H04R 1/1041; H04R 2420/07; H04R 2201/107; H04R 2205/021; H04R 2460/17
See application file for complete search history.

(56) References Cited

U.S. PATENT DOCUMENTS 11,172,101 B1 * 11/2021 Boozer .................. H04N 23/57
2007/0104343 A1 * 5/2007 Bengtsson ........... H04R 25/305 381/322
2020/0304898 A1 * 9/2020 Cohen .................. H04R 1/1016
2021/0296915 A1 * 9/2021 Feng .................... H04R 1/1016
2021/0351601 A1 * 11/2021 Chao .................... H04R 1/1016
2022/0369008 A1 * 11/2022 Kim ..................... A45C 11/001
2023/0066353 A1 * 3/2023 Smith .................. H04R 1/1025
2023/0217150 A1 * 7/2023 Seok .................... H04R 1/1016 381/74
2024/0430603 A1 * 12/2024 Johnston ................. H04R 1/02

FOREIGN PATENT DOCUMENTS

CN 205883491 U * 1/2017
CN 208353029 1/2019
CN 112437378 3/2021
CN 216721552 U * 6/2022
CN 218352697 1/2023
CN 219627866 U * 9/2023

* cited by examiner

*Primary Examiner* — Matthew A Eason
(74) *Attorney, Agent, or Firm* — JCIPRNET

(57) ABSTRACT

A wireless earphone assembly including a charging box and a wireless earphone is disclosed. The charging box includes a first casing and a second casing slidingly connected to the first casing, where the first casing has a first recess, a cavity connected to the first recess, and sound emitting holes connected to the first recess, and the cavity is sleeved on the second casing. The second casing has sound receiving holes opposite to the sound emitting holes and a channel disposed corresponding to the first recess, and the sound receiving holes are connected to the channel. The wireless earphone includes a sound emitting part and a sound receiving part opposite to the sound emitting part, and the sound emitting part is accommodated in the first recess.

11 Claims, 9 Drawing Sheets

10

WIRELESS EARPHONE ASSEMBLY

CROSS-REFERENCE TO RELATED APPLICATION

This application claims the priority benefit of Taiwan application serial no. 112127252, filed on Jul. 21, 2023. The entirety of the above-mentioned patent application is hereby incorporated by reference herein and made a part of this specification.

BACKGROUND

Technical Field

This disclosure relates to a wireless earphone, and in particular to a wireless earphone assembly.

Description of Related Art

With the features of simplicity, lightness and portability, and without the problem of tangled earphone cords, wireless earphones have become an indispensable electronic product for modern people in their daily life or work. In detail, most wireless earphones are stored in a charging box and charged. When making a voice call, the user must first take out the wireless earphone from the charging box and put it on the ear before the user can make a voice call, which is a little inconvenient.

SUMMARY

The disclosure provides a wireless earphone assembly with excellent ease of operation.

The disclosure one implementation includes charging box and wireless earphone. The charging box includes the first casing and the second casing slidingly connected to the first casing. The first casing has a first recess, a cavity connected to the first recess, and a sound emitting hole connected to the first recess, and the cavity is set on the second casing. The second casing has a sound receiving hole relative to the sound emitting hole and a channel set corresponding to the first recess, and the sound receiving hole is connected to the channel. The wireless earphone includes a sound emitting part and a sound receiving part relative to the sound emitting part, and the sound emitting part is accommodated in the first recess. In the first state, the channel is connected to the first recess, and the sound receiving part is inserted into the channel. In the second state, the sound receiving part moves out of the channel and into the cavity, and the channel is connected to the first recess through the cavity.

The disclosure The wireless earphone assembly of another embodiment includes a charging box and a wireless earphone. The charging box includes casing. Casing has a first recess, a cavity connected to the first recess, a sound emitting hole connected to the first recess, and a sound receiving hole opposite to the sound emitting hole and connected to the cavity. Wireless earphone includes sound emitting part and sound receiving part relative to sound emitting part. The sound emitting part is stored in the first recess. The sound receiving part is inserted into the cavity and extends to the sound receiving hole.

Based on the above, in the wireless earphone assembly of the disclosure, the charging box is equipped with relative sound emitting hole and sound receiving hole for users to make voice calls directly without taking out the wireless earphone from the charging box, so it has an excellent ease of operation.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
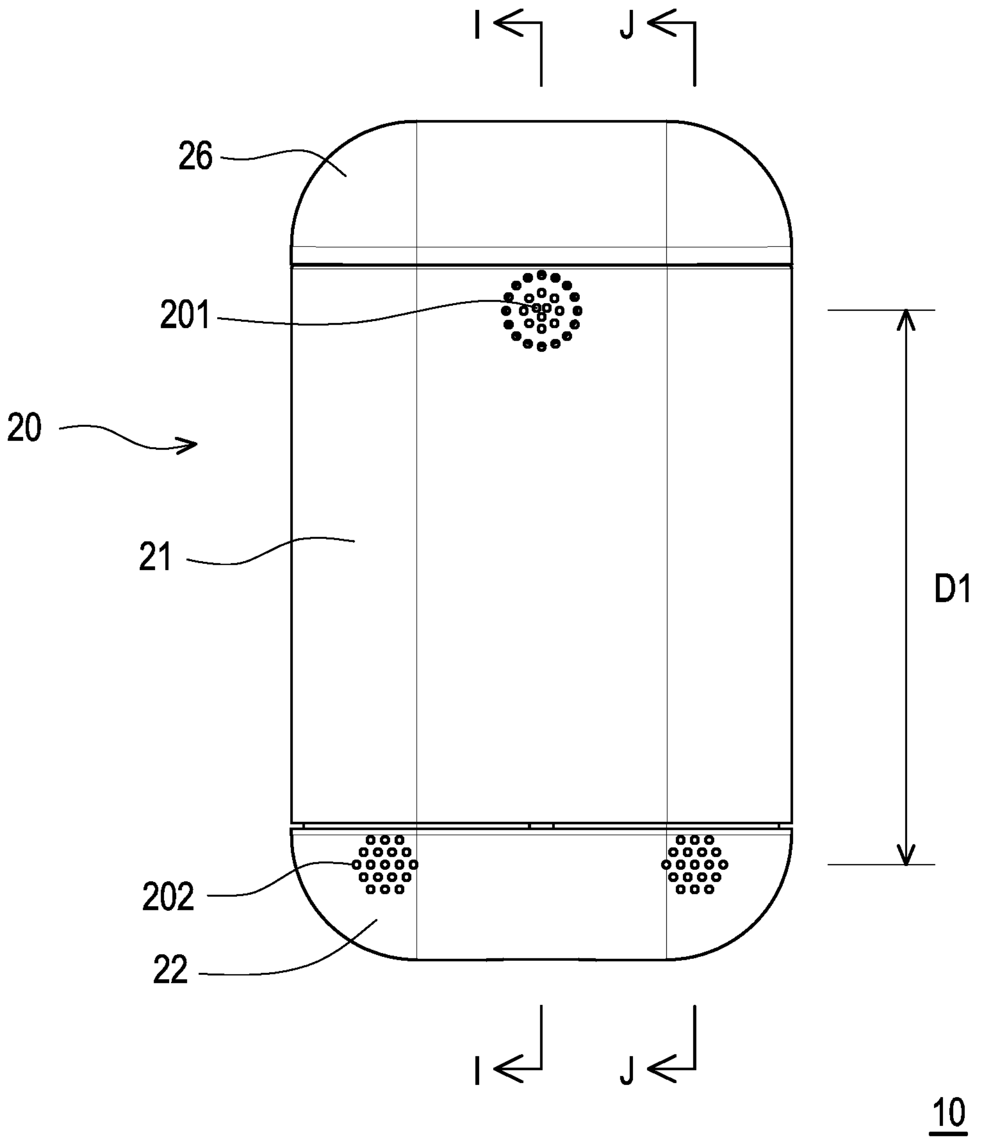
FIG. 1A is a schematic view of a wireless earphone assembly in a first state according to an embodiment of the disclosure.
Figure 1B:
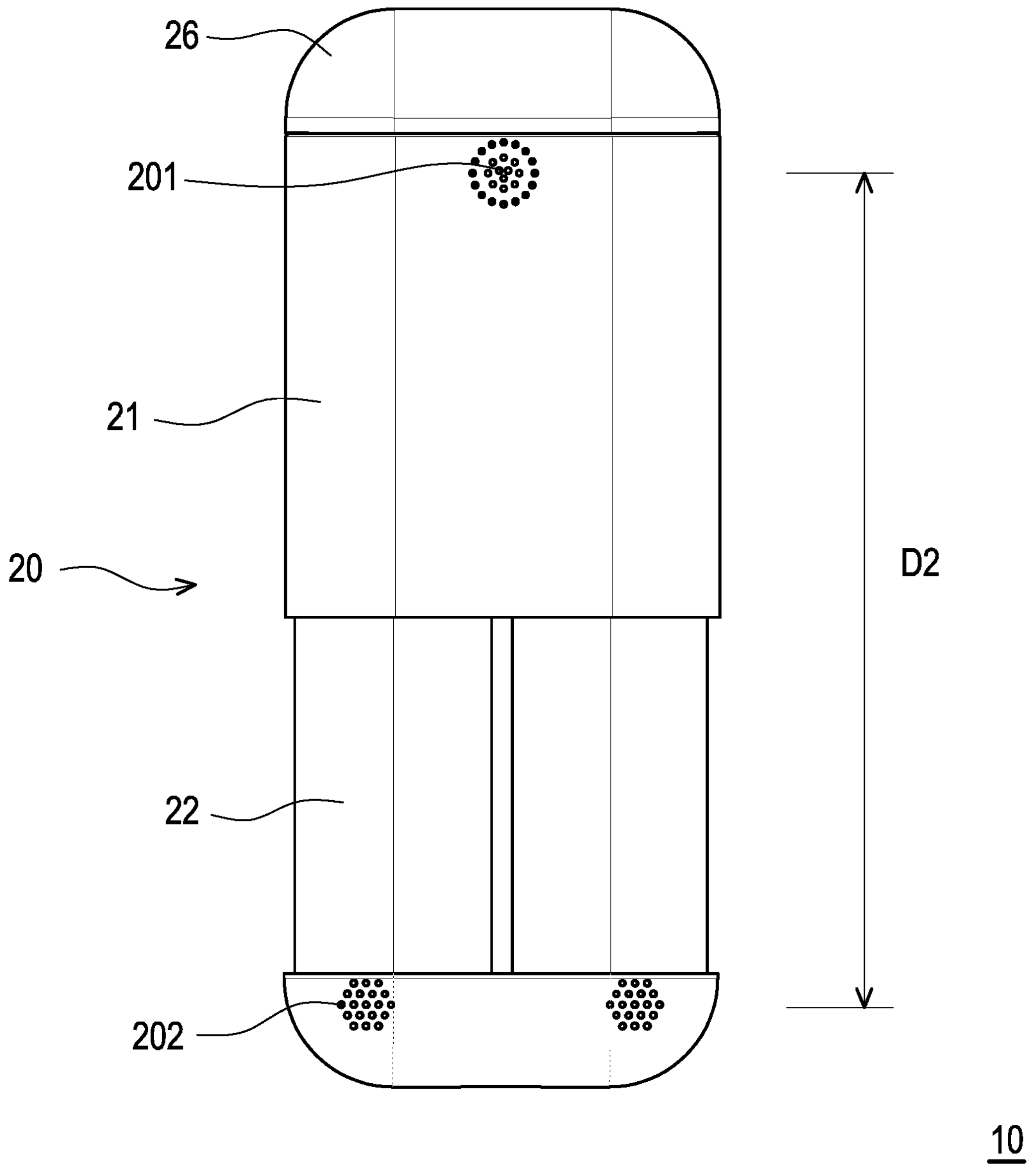
FIG. 1B is a schematic view of the wireless earphone assembly in FIG. 1A switching to a second state.
Figure 1C:
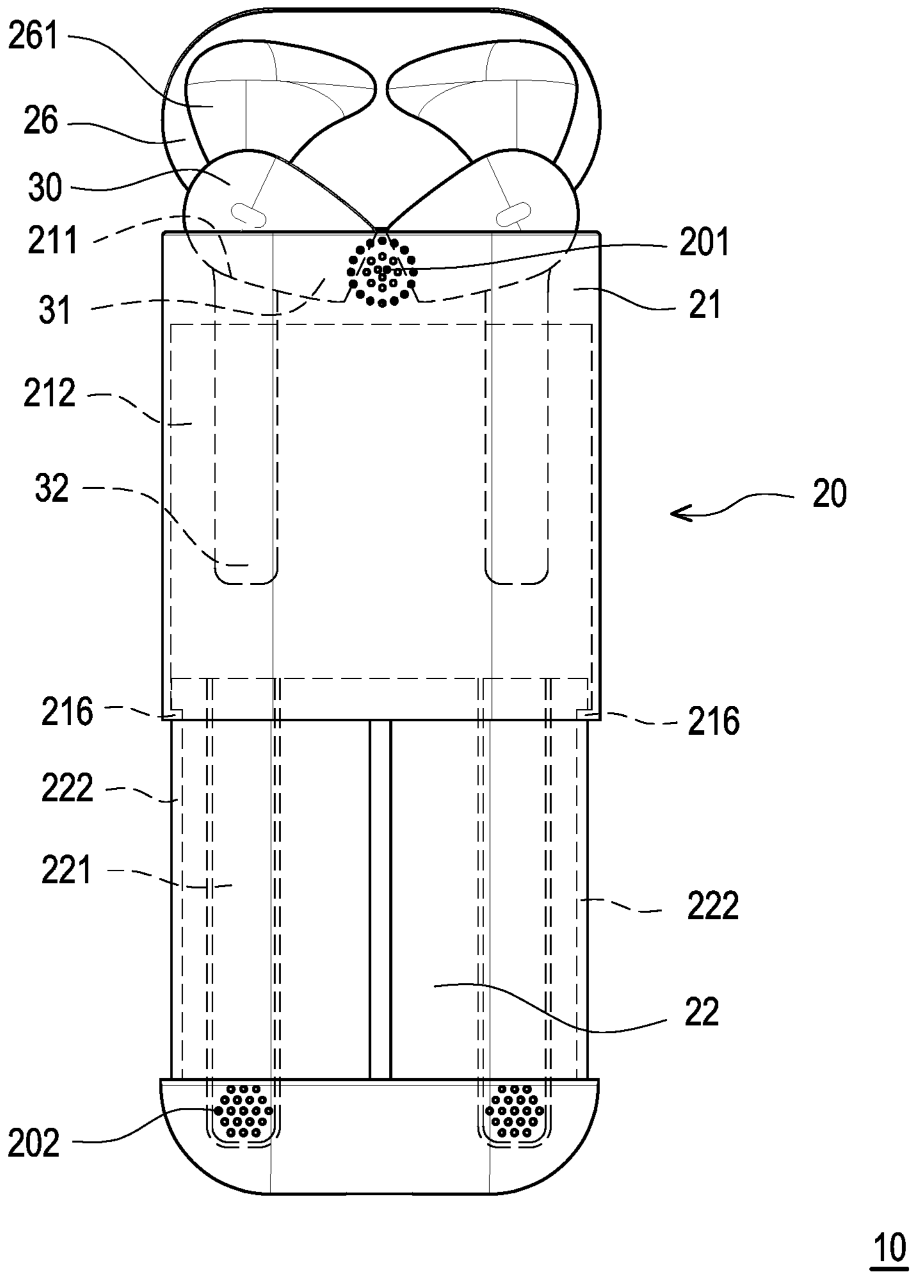
FIG. 1C is a schematic view of a flip cover in FIG. 1B that has been lifted.

FIG. 1A is a schematic view of a wireless earphone assembly in a first state according to an embodiment of the disclosure. FIG. 1B is a schematic view of the wireless earphone assembly in FIG. 1A switching to a second state. FIG. 1C is a schematic view of a flip cover in FIG. 1B that has been lifted. Referring to FIG. 1A to FIG. 1C, in this embodiment, a wireless earphone assembly 10 includes a charging box 20 and a wireless earphone 30. The wireless earphone 30 may be accommodated in the charging box 20, and the charging box 20 is adapted to charge the wireless earphone 30. In addition, a user may take out the wireless earphone 30 from the charging box 20 and put the wireless earphone 30 on the ear, depending on the operational requirements. The wireless earphone 30 includes a sound emitting part 31 and a sound receiving part 32 opposite to the sound emitting part 31. The sound emitting part 31 may be provided with a speaker, and the sound receiving part 32 may be provided with a microphone. Furthermore, the charging box 20 is provided with a sound emitting hole 201 corresponding to the sound emitting part 31, and is provided with a sound receiving hole 202 corresponding to the sound receiving part 32. When making a voice call, the user does not need to take out the wireless earphone 30 from the charging box 20, and the wireless earphone 30 may be connected and paired with an electronic device (e.g., a smart phone, a tablet computer, a laptop computer, or a smart watch), and the voice of the caller may be transmitted directly from the sound emitting part 31 of the wireless earphone 30 to the sound emitting hole 201 and be transmitted to the outside world through the sound emitting hole 201, whereas the voice of the user may be transmitted to the sound receiving part 32 of the wireless earphone 30 through the sound receiving hole 202 and be received by the sound receiving part 32.

Continuing with the above, the wireless earphone assembly 10 provides different voice call modes, and the user may make voice calls directly through the charging box 20, thus providing excellent operational convenience. In addition to the function of voice calls, the wireless earphone assembly 10 may also be used as a wireless speaker to play music or other audio through the sound emitting part 31 of the wireless earphone 30 and the sound emitting hole 201 of the charging box 20.

The charging box 20 has a telescoping design. With the telescoping of the charging box 20, a distance between the sound emitting hole 201 and the sound receiving hole 202 may be adjusted between a first distance D1 and a second distance D2. Further, in the first state shown in FIG. 1A, the sound emitting hole 201 and the sound receiving hole 202 are separated by the first distance D1, for example, the shortest distance. In the second state shown in FIG. 1B, the sound emitting hole 201 and the sound receiving hole 202 are separated by the second distance D2, for example, the longest distance. Users may adjust the required operation dimensions according to their individual needs.

In one example, regardless of whether the charging box 20 is in the first state, the second state, or other states between the first state and the second state, the user may choose not to take the wireless earphone 30 out of the charging box 20, and directly receive and emit sound through the sound emitting hole 201 and the sound receiving hole 202 of the charging box 20.

In one example, an operation mode of the wireless earphone assembly 10 may be switched based on telescoping the charging box 20, such as by determining the telescoping status of the charging box 20 through a magnetic sensing mechanism, a light sensing mechanism, other non-contact sensing mechanism, or a contact sensing mechanism, to switch between a charging mode, a voice call mode, a music playback mode, or other operation modes.

As shown in FIG. 1A to FIG. 1C, the charging box 20 includes a first casing 21 and a second casing 22 slidingly connected to the first casing 21. The sound emitting hole 201 is located in the first casing 21, and the sound receiving hole 202 is located in the second casing 22. Thus, as the second casing 22 slides relative to the first casing 21, the charging box 20 telescopes and adjusts the distance between the sound emitting hole 201 and the sound receiving hole 202.

Figure 2A:
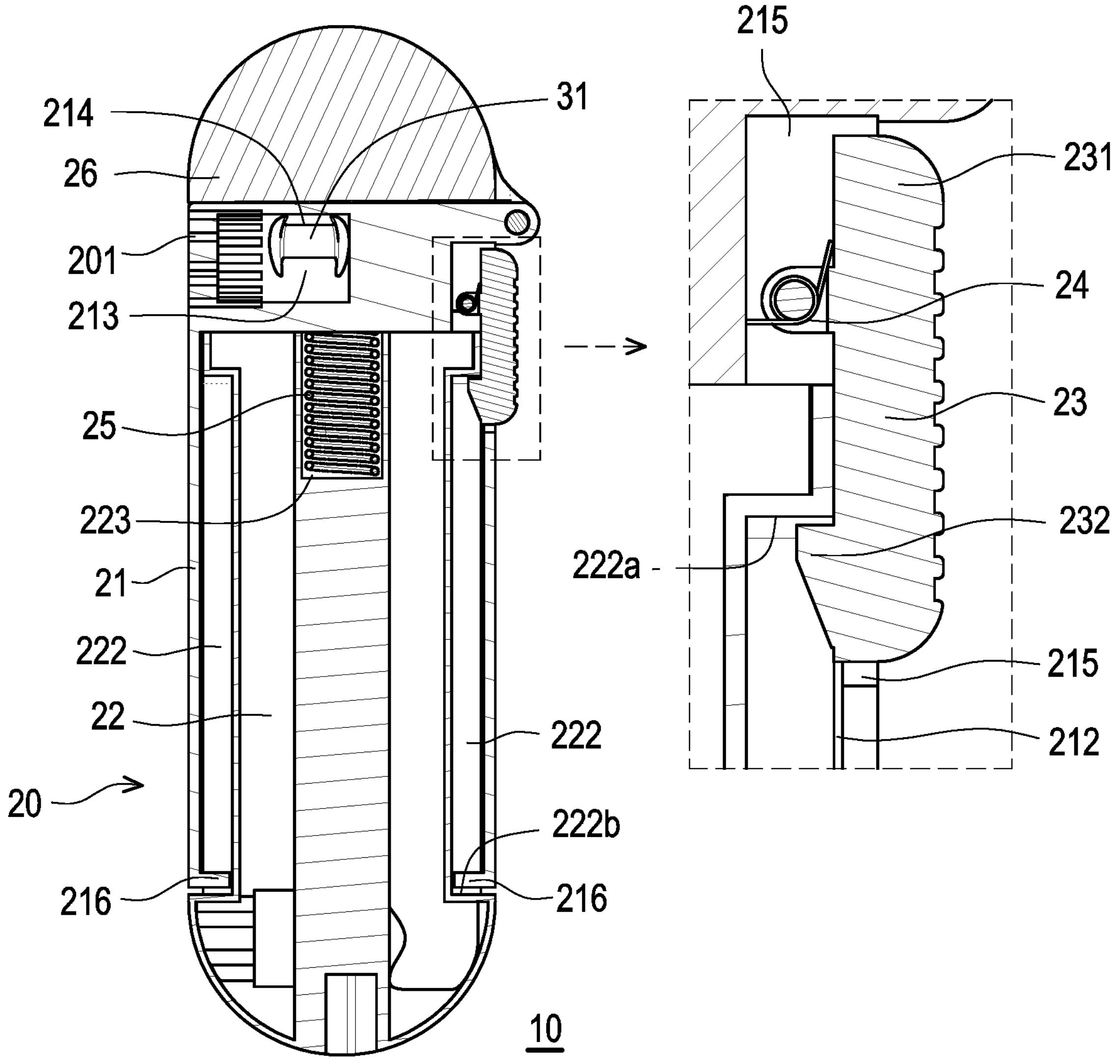
FIG. 2A is a schematic cross-sectional view of the wireless earphone assembly in FIG. 1A along a section line I-I.
Figure 2B:
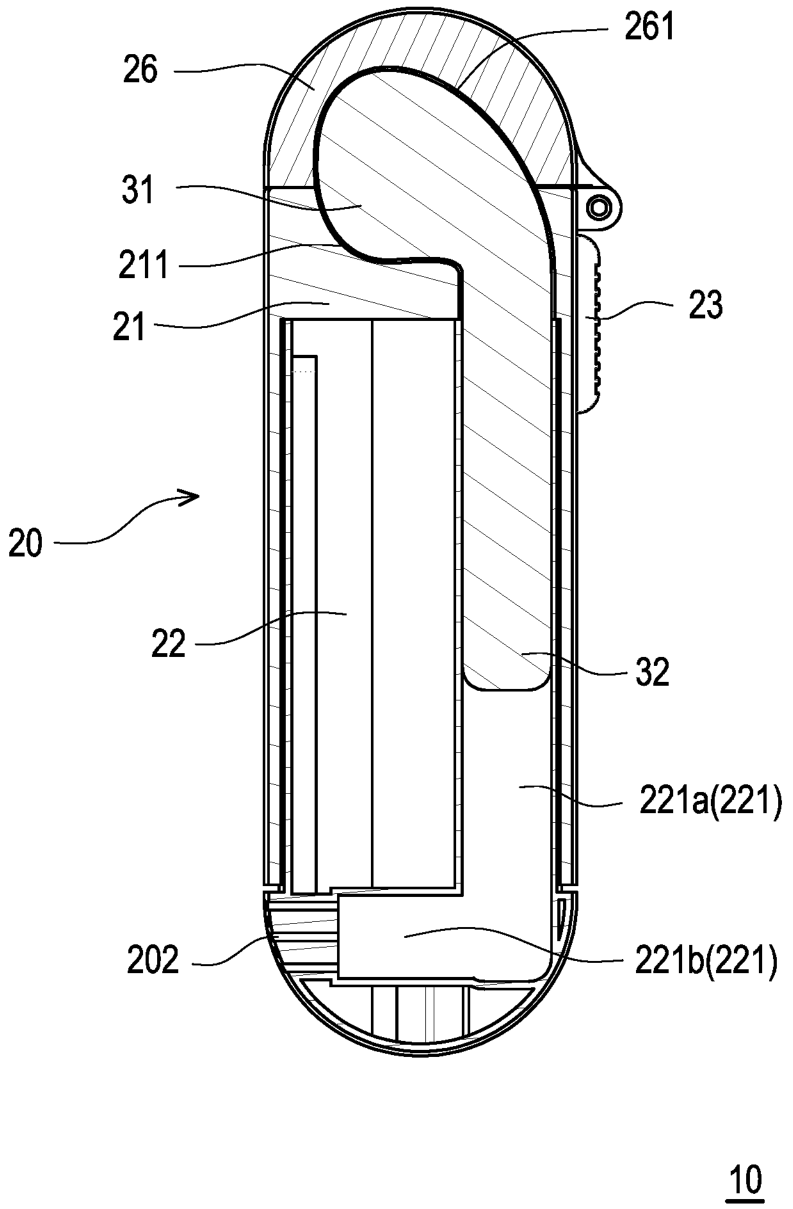
FIG. 2B is a schematic cross-sectional view of the wireless earphone assembly in FIG. 1A along a section line J-J.

FIG. 2A is a schematic cross-sectional view of the wireless earphone assembly in FIG. 1A along a section line I-I. FIG. 2B is a schematic cross-sectional view of the wireless earphone assembly in FIG. 1A along a section line J-J. Referring to FIG. 1A, FIG. 1C, FIG. 2A, and FIG. 2B, in this embodiment, the first casing 21 has a first recess 211, a cavity 212 connected to the first recess 211, and the sound emitting hole 201 connected to first recess 211, and the cavity 212 is sleeved on the second casing 22. That is, the first casing 21 is slidably sleeved on the second casing 22.

On the other hand, the second casing 22 has the sound receiving hole 202 opposite to the sound emitting hole 201 and a channel 221 disposed corresponding to the first recess 211, and the sound receiving hole 202 is connected to the channel 221. Specifically, the sound emitting part 31 is accommodated in the first recess 211, and in the first state shown in FIG. 2B, the channel 221 is connected to the first recess 211, and the sound receiving part 32 is inserted into the channel 221.

As shown in FIG. 2A, the first casing 21 further has a sound emitting channel 213, and the first recess 211 has a sound emitting opening 214. The sound emitting hole 201 is connected to the sound emitting channel 213, and the sound emitting channel 213 is connected to the sound emitting opening 214. That is, the first recess 211 is connected to the sound emitting hole 201 through the sound emitting channel 213 to transmit the sound from the sound emitting part 31 to the outside.

As shown in FIG. 1A, FIG. 2A, and FIG. 2B, in the first state, the sound from the sound emitting part 31 is transmitted to the outside through the first recess 211, the sound emitting channel 213, and the sound emitting hole 201 in sequence, and relatively, the voice of the user or the sound of the outside world may be transmitted to the channel 221 through the sound receiving hole 202, and received by the sound receiving part 32 inserted in the channel 221.

In this embodiment, the channel 221 has a first section **221*a* and a second section 221*b* connected to the first section 221*a*. In the first state, the first section 221*a* is connected to the first recess 211, and the sound receiving part 32 is inserted into the first section 221*a*. On the other hand, the sound receiving hole 202 is connected to the second section 221*b*, the voice of the user or the sound of the outside world may be transmitted to the second section 221*b* through the sound receiving hole 202, and then transmitted to the first section 221*a* from the second section 221*b*, and finally be received by the sound receiving part 32 inserted in channel 221. For example, the first section 221*a* is perpendicular to second section 221*b***.

Referring to FIG. 2A, in this embodiment, the charging box 20 further includes a button 23 for locking the second casing 22 to the first casing 21 or releasing a locking relationship between the first casing 21 and the second casing 22. In detail, the button 23 is pivotally connected to the first casing 21, where the first casing 21 further has a groove 215 connected to a top of the cavity 212, and at least a part of the button 23 is disposed in the groove 215.

The button 23 includes a pressing part 231 and a locking part 232 opposite to the pressing part 231, and the second casing 22 has a chute 222 corresponding to the locking part 232. In the first state, at least a part of the chute 222 is disposed in alignment with the groove 215, and the locking part 232 is inserted into the chute 222 and engaged with the chute 222 to lock the first casing 21 and the second casing 22. That is, the second casing 22 cannot slide relative to the first casing 21 when stopped by the button 23.

Figure 3:
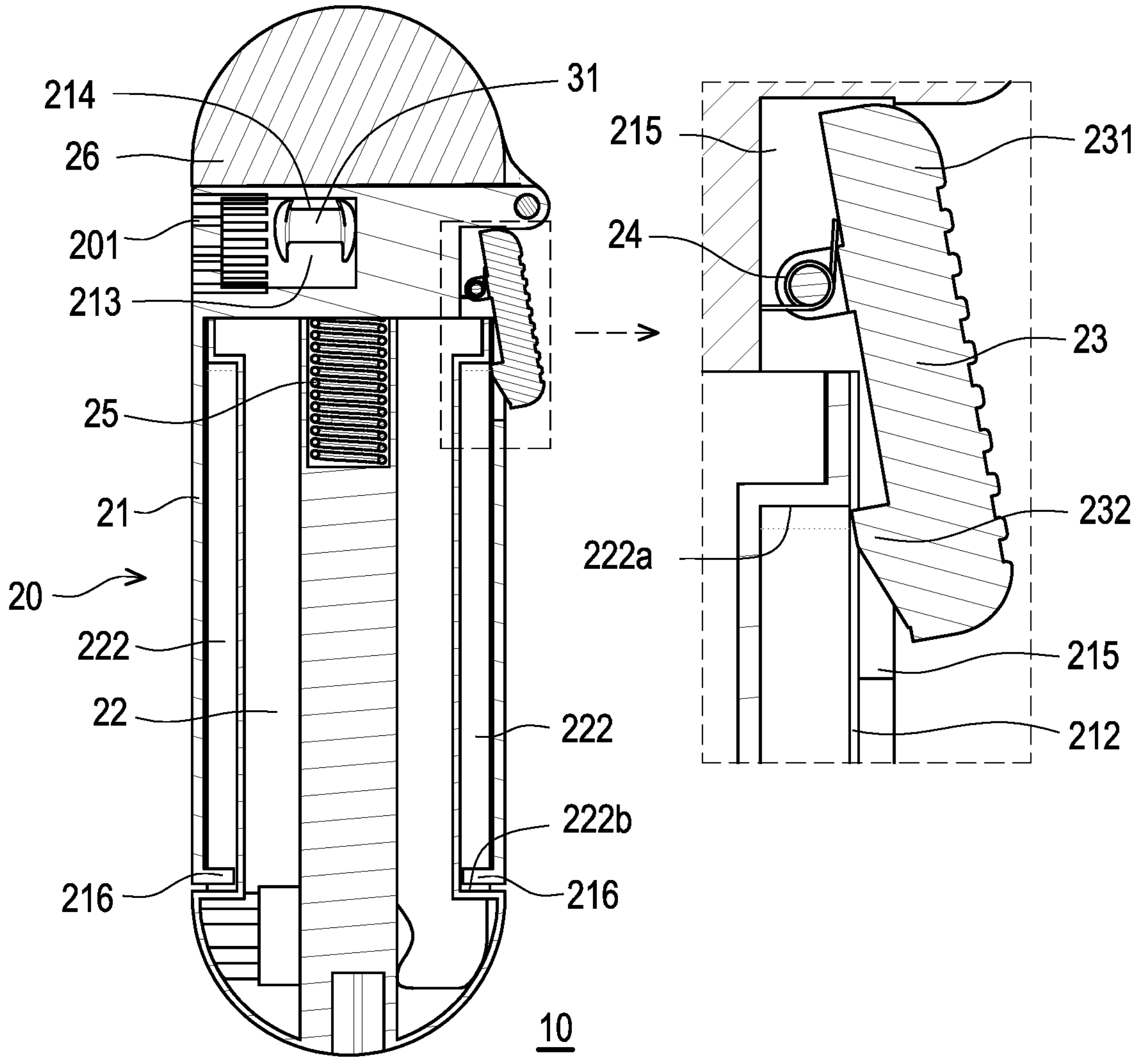
FIG. 3 is a schematic cross-sectional view showing that a locking relationship between a first casing and a second casing in FIG. 2A is released.
Figure 4A:
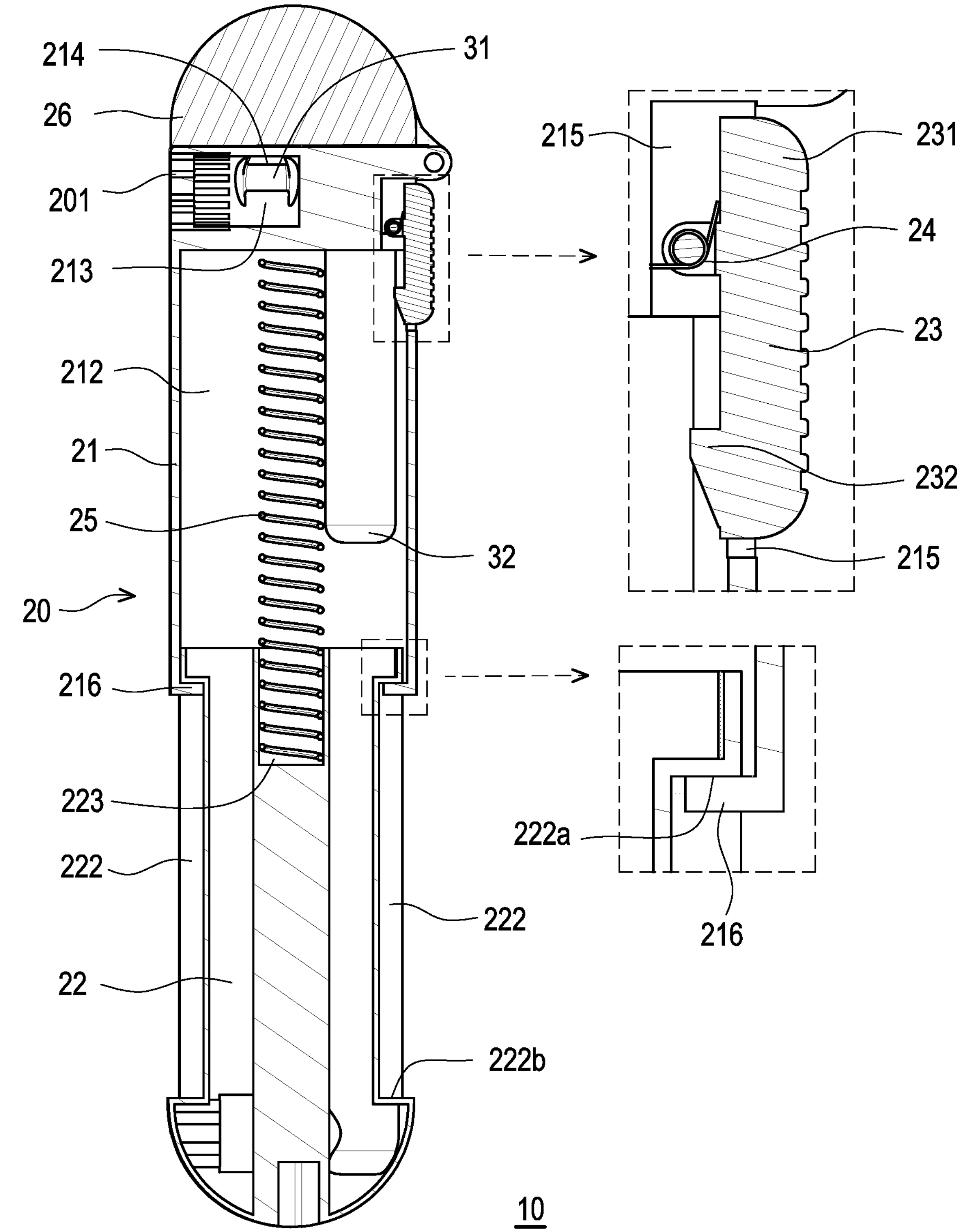
FIG. 4A is a schematic cross-sectional view of FIG. 2A switching to a second state.
Figure 4B:
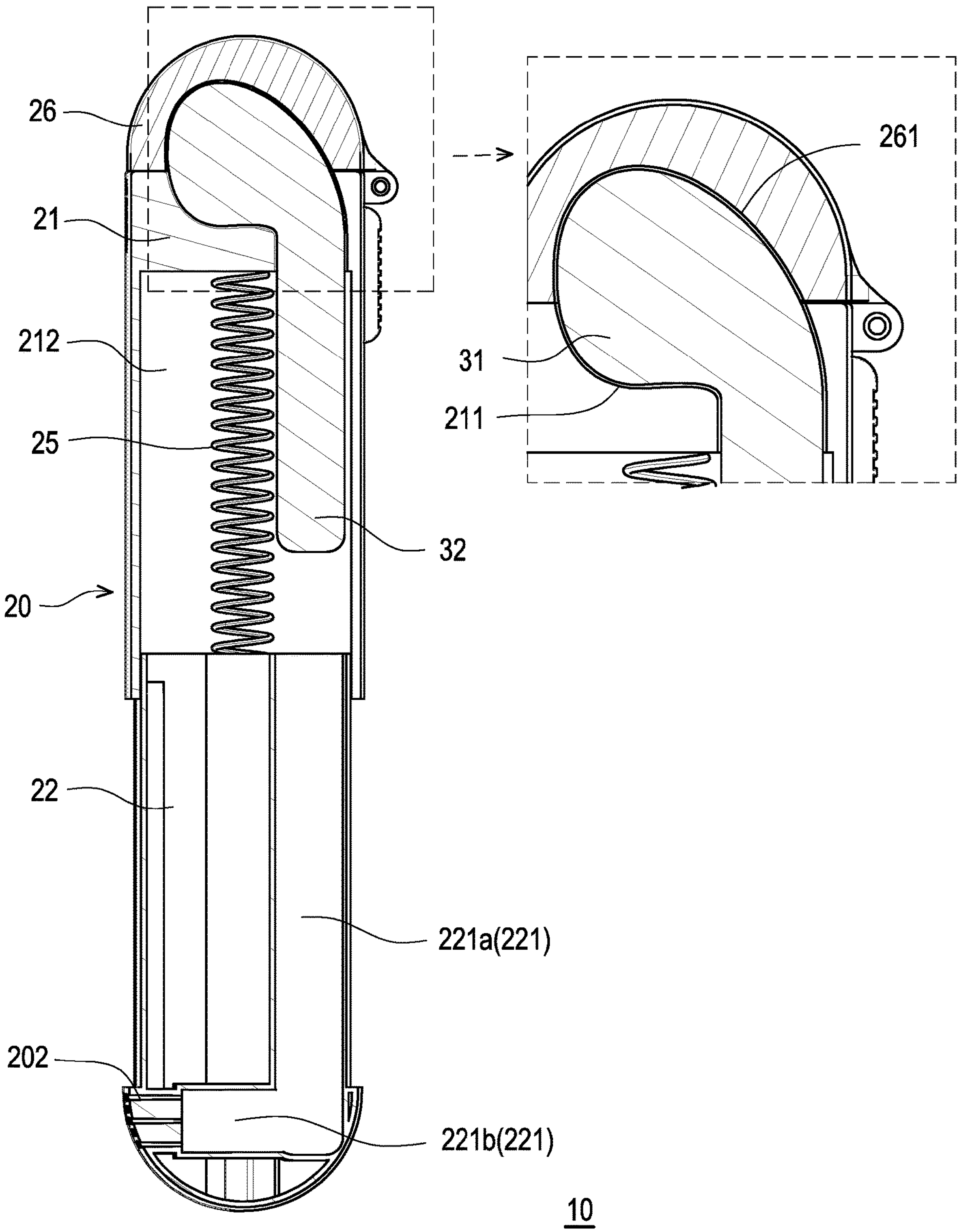
FIG. 4B is a schematic cross-sectional view of FIG. 2B switching to a second state.

FIG. 3 is a schematic cross-sectional view showing that a locking relationship between a first casing and a second casing in FIG. 2A is released. FIG. 4A is a schematic cross-sectional view of FIG. 2A switching to a second state. FIG. 4B is a schematic cross-sectional view of FIG. 2B switching to a second state. Referring to FIG. 3 and FIG. 4A, the user may apply pressing force on the pressing part 231 to make the locking part 232 rotate out of the chute 222 to release the locking relationship between the first casing 21 and the second casing 22. After the locking relationship between the first casing 21 and the second casing 22 is released, the user may push or pull the second casing 22 to slide relative to the first casing 21 and switch to the second state, or alternatively, the second casing 22 may be automatically slide relative to the first casing 21 and switch to the second state.

In this embodiment, the charging box 20 further includes a torsion spring 24 and a compression spring 25, where the torsion spring 24 is disposed in the groove 215, and opposite ends of the torsion spring 24 are connected to the pressing part 231 and the first casing 21, respectively. When the pressing part 231 is pressed, the torsion spring 24 is squeezed, as shown in FIG. 3. Once the pressing force applied to the pressing part 231 is removed, elastic restoring force of the torsion spring 24 may push the button 23 to rotate back to the initial position, as shown in FIG. 4A.

As shown in FIG. 2A, FIG. 3, and FIG. 4A, the second casing 22 has a positioning space 223 for accommodating at least a part of the compression spring 25, and opposite ends of the compression spring 25 contact the first casing 21 and the second casing 22 respectively. In the first state, the compression spring 25 is squeezed between the first casing 21 and the second casing 22 and may be completely accommodated in the positioning space 223. When the locking relationship between the first casing 21 and the second casing 22 is released, the elastic restoring force of the compression spring 25 may automatically push the second casing 22 to slide relative to the first casing 21 to switch to the second state. In addition, a part of the stretched compression spring 25 is located in the positioning space 223, and another part extends out of the positioning space 223 to extend into the first casing 21, for example, into the cavity 212.

As shown in FIG. 2A, FIG. 3, and FIG. 4A, in this embodiment, the first casing 21 further has a limiting protrusion 216 protruding from a bottom of the cavity 212, and the limiting protrusion 216 is slidably disposed in the chute 222. Furthermore, sliding cooperation between the limiting protrusion 216 and the chute 222 may be used to determine a sliding direction and a sliding route of the second casing 22.

The chute 222 has a first inner wall surface 222*a* and a second inner wall surface 222*b* opposite to the first inner wall surface 222*a*. In the first state, the locking part 232 contacts the first inner wall surface 222*a* to stop the second casing 22, preventing the second casing 22 from sliding relative to the first casing 21 when pushed by the compression spring 25. In addition, the limiting protrusion 216 is disposed in alignment with the second inner wall surface 222*b*.

When the locking part 232 is separated from the first inner wall surface 222*a*, the compression spring 25 pushes the second casing 22 to slide relative to the first casing 21, so that the second inner wall surface 222*b* moves away from the limiting protrusion 216, and the first inner wall surface 222*a* moves toward the limiting protrusion 216. When the first inner wall surface 222*a* touches the limiting projection 216, the second casing 22 stops sliding and switches to the second state. That is, the sliding cooperation between the limiting protrusion 216 and the chute 222 may be used to prevent the second casing 22 from accidentally slipping off the first casing 21.

As shown in FIG. 1C, FIG. 2A, and FIG. 4A, the first casing 21 may be provided with one or more limiting protrusions 216, and a periphery of the second casing 22 is correspondingly provided with one or more chutes 222. In detail, the limiting protrusion 216 is slidably disposed in the chute 222 to improve the stability of the second casing 22 sliding relative to the first casing 21.

As shown in FIG. 1C and FIG. 4B, in the second state, the sound receiving part 32 is moved out of the first section 221*a* of the channel 221 and into the cavity 212. Specifically, the first section 221*a* of the channel 221 is connected to the first recess 211 through the cavity 212, and in the second state, the voice of the user or the sound of the outside world may be transmitted to the channel 221 through the sound receiving hole 202, and then transmitted to the cavity 212 through the channel 221, and finally received by the sound receiving part 32 inserted in cavity 212.

As shown in FIG. 2A and FIG. 4A, when the charging box 20 is switched between the first state and the second state, a sound emitting path does not substantially change. As shown in FIG. 2B and FIG. 4B, when the charging box 20 switches between the first state and the second state, a sound receiving path changes, such as lengthening from a first sound receiving path in the first state to a sound receiving path in the second state.

As shown in FIG. 1C and FIG. 2B, the charging box 20 further includes a flip cover 26 pivotally connected to the first casing 21, and the flip cover 26 has a second recess 261 disposed corresponding to the first recess 211. When the flip cover 26 is closed over the first casing 21, the sound emitting part 31 is accommodated in the first recess 211 and the second recess 261. When the flip cover 26 is lifted relative to the first casing 21, the sound emitting part 31 moves out of the second recess 261, or the second recess 261 moves away from the sound emitting part 31.

In one example, the operation mode of the wireless earphone assembly 10 may be switched based on lifting and closing of the flip cover 26, such as by determining the lifting and closing status of the flip cover 26 through a magnetic sensing mechanism, a light sensing mechanism, other non-contact sensing mechanism, or a contact sensing mechanism, to switch between a charging mode, a voice call mode, a music playback mode, or other operation modes.

As shown in FIG. 1A and FIG. 2A, the sound emitting hole 201 and the button 23 are located on a top of the first casing 21 and are respectively located on two opposite surfaces, such as on the front and the rear surface respectively. As shown in FIG. 1A, FIG. 2B, and FIG. 4B, the flip cover 26 is pivotally connected to the top of the first casing 21 for covering the first recess 211 on the top of the first casing 21. In addition, the channel 221 extends from a top of the second casing 22 to a bottom of the second casing 22, and is connected to the sound receiving hole 202 located at the bottom of the second casing 22. Besides, the sound emitting hole 201 and the sound receiving hole 202 are located on the same side of the charging box 20.

As shown in FIG. 1C, FIG. 2A, and FIG. 2B, the wireless earphone 30 is configured in pairs, and accordingly, the first casing 21 is provided with two first recesses 211 for accommodating two sound emitting parts 31 of two wireless earphones 30. For example, the two sound emitting parts 31 face the same sound emitting channel 213, so that sound from the two sound emitting parts 31 is transmitted outward through the same sound emitting channel 213 and the same set of sound emitting holes 201. On the other hand, the second casing 22 has two channels 221 for insertion or removal of two sound receiving parts 32 of the two wireless earphones 30. For example, the two channels 221 are respectively connected with the two sets of sound receiving holes 202, and the sound of the outside world may be transmitted to the two channels 221 through the two sets of sound receiving holes 202, respectively, and received by the two sound receiving parts 32 respectively.

Figure 5:
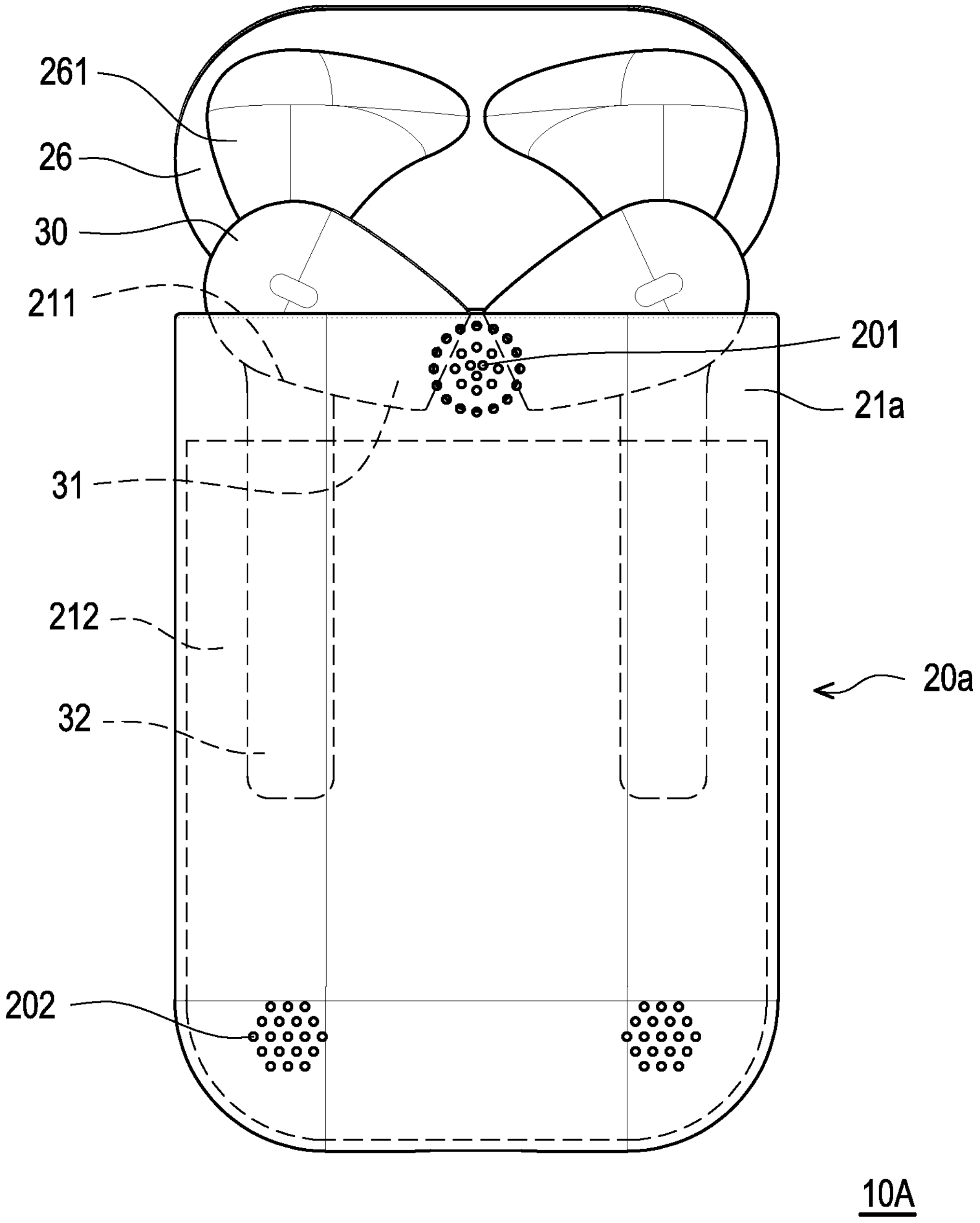
FIG. 5 is a schematic diagram of a wireless earphone charging assembly according to another embodiment of the disclosure.

FIG. 5 is a schematic diagram of a wireless earphone charging assembly according to another embodiment of the disclosure. Referring to FIG. 5, the design principle of a wireless earphone charging assembly 10A of this embodiment is substantially the same as the design principle of the wireless earphone charging assembly 10 of the previous embodiment, and the main differences between the two will be described below. In this embodiment, the wireless earphone charging assembly 10A does not have a telescoping mechanism, where a charging box 20*a* is composed of a single casing 21*a*, and the first recess 211 is directly connected to the sound receiving hole 202 through the cavity 212. In addition, the sound receiving part 32 of the wireless earphone 30 is inserted into the cavity 212 and extends toward the sound receiving hole 202. Thus, the voice of the user or the sound of the outside world may be transmitted to the cavity 212 through the sound receiving hole 202, so as to be received by the sound receiving part 32 inserted in the cavity 212.

To sum up, the wireless earphone assembly of the disclosure provides different voice call modes, and the user may make voice calls directly through the charging box, thus providing excellent operational convenience. In detail, the charging box is provided with the sound emitting hole and the sound receiving hole opposite to the sound emitting hole. The sound emitting hole is disclosed corresponding to the sound emitting part of the wireless earphone, and the sound receiving hole is disclosed corresponding to the sound receiving part of the wireless earphone. When making a voice call, the user does not need to take out the wireless earphone from the charging box, and the wireless earphone may be connected and paired with an electronic device (e.g., a smart phone, a tablet computer, a laptop computer, or a smart watch), and the voice of the caller may be transmitted directly from the sound emitting part of the wireless earphone to the sound emitting hole and be transmitted to the outside world through the sound emitting hole, whereas the voice of the user may be transmitted to the sound receiving part of the wireless earphone through the sound receiving hole and be received by the sound receiving part.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A wireless earphone assembly comprising:

a charging box comprising a first casing and a second casing slidingly connected to the first casing, wherein the first casing has a first recess, a cavity connected to the first recess, and a sound emitting hole connected to the first recess, the cavity is sleeved on the second casing, the second casing has a sound receiving hole opposite to the sound emitting hole and a channel disposed corresponding to the first recess, and the sound receiving hole is connected to the channel; and a wireless earphone comprising a sound emitting part and a sound receiving part opposite to the sound emitting part, and the sound emitting part is accommodated in the first recess, wherein in a first state, the channel is connected to the first recess, and the sound receiving part is inserted into the channel; in a second state, the sound receiving part is moved out of the channel and into the cavity, and the channel is connected to the first recess through the cavity.

2. The wireless earphone assembly according to claim 1, wherein the first casing further has a sound emitting channel, the first recess has a sound emitting opening, the sound emitting hole is connected to the sound emitting channel, and the sound emitting channel is connected to the sound emitting opening.

3. The wireless earphone assembly according to claim 1, wherein the channel has a first section connected to the first recess or the cavity and a second section connected to the first section, the sound receiving part is adapted to be inserted into or moved out of the first section, and the sound receiving hole is connected to the second section.

4. The wireless earphone assembly according to claim 3, wherein the first section is perpendicular to the second section.

5. The wireless earphone assembly according to claim 1, wherein the charging box further comprises:

a button pivotally connected to the first casing, wherein the first casing further has a groove connected to a top of the cavity, and at least a part of the button is disposed in the groove, the button comprises a pressing part and a locking part opposite to the pressing part, and the second casing has a chute disposed corresponding to the locking part, wherein in the first state, at least a part of the chute is disposed in alignment with the groove, and the locking part is engaged with the chute to lock the first casing and the second casing, when the pressing part is pressed, the locking part rotates out of the chute to release a locking relationship between the first casing and the second casing, and the second casing is adapted to slide relative to the first casing and to switch to the second state.

6. The wireless earphone assembly according to claim 5, wherein the charging box further comprises:

a torsion spring disposed in the groove, wherein opposite ends of the torsion spring are respectively connected to the pressing part and the first casing.

7. The wireless earphone assembly according to claim 5, wherein the charging box further comprises:

a compression spring disposed in the first casing or the second casing, wherein opposite ends of the compression spring are in contact with the first casing and the second casing respectively, the compression spring is squeezed between the first casing and the second casing in the first state, and elastic restoring force of the compression spring pushes the second casing to slide relative to the first casing in order to switch to the second state.

8. The wireless earphone assembly according to claim 5, wherein the first casing further has a limiting protrusion protruding from a bottom of the cavity, the limiting protrusion is slidably disposed in the chute, and the chute has a first inner wall surface and a second inner wall surface opposite to the first inner wall surface, wherein in the first state, the locking part contacts the first inner wall surface, and the limiting protrusion is disposed in alignment with the second inner wall surface; in the second state, the locking part is separated from the first inner wall surface, and the limiting protrusion moved away from the second inner wall surface contacts the first inner wall surface.

9. The wireless earphone assembly according to claim 1, wherein the first casing further has a limiting protrusion protruding from a bottom of the cavity, a periphery of the second casing is provided with a chute corresponding to the limiting protrusion, and the limiting protrusion is slidably disposed in the chute.

10. The wireless earphone assembly according to claim 1, wherein the sound emitting hole is separated from the sound receiving hole by a first distance in the first state, and the sound emitting hole is separated from the sound receiving hole by a second distance greater than the first distance in the second state.

11. The wireless earphone assembly according to claim 1, wherein the charging box further comprises a flip cover pivotally connected to the first casing, the flip cover has a second recess disposed corresponding to the first recess, and the sound emitting part is accommodated in the first recess and the second recess.

* * * * *